United States Patent [19]

Kimura

[11] Patent Number: 5,475,930
[45] Date of Patent: Dec. 19, 1995

[54] ROTATING AND DRIVING SYSTEM FOR SURVEY INSTRUMENT

[75] Inventor: Akio Kimura, Tokyo, Japan

[73] Assignee: Kabushiki Kaisha Topcon, Tokyo, Japan

[21] Appl. No.: 266,030

[22] Filed: Jun. 27, 1994

[30] Foreign Application Priority Data

Jun. 29, 1993 [JP] Japan .................. 5-184448
Jun. 29, 1993 [JP] Japan .................. 5-184449

[51] Int. Cl.⁶ .................. G01C 5/00; F16H 15/00
[52] U.S. Cl. .................. 33/290; 74/405; 74/425
[58] Field of Search .................. 33/290, 291, 292, 33/299; 74/405, 425

[56] References Cited

U.S. PATENT DOCUMENTS

| | | | |
|---|---|---|---|
| 1,777,437 | 10/1930 | Hott | 74/405 |
| 3,247,837 | 4/1966 | Wiseman | 74/405 |
| 3,856,409 | 12/1974 | Cindrich et al. | 33/291 |
| 4,333,242 | 6/1982 | Genho, Sr. | 33/290 |
| 4,370,813 | 2/1983 | Burninski | 33/291 |
| 4,683,770 | 8/1987 | Nettmann | 74/405 |
| 4,933,161 | 6/1990 | Borkovitz | 33/291 |
| 4,973,158 | 11/1990 | Marsh | 33/291 |

FOREIGN PATENT DOCUMENTS

| | | |
|---|---|---|
| 60-123788 | 7/1985 | Japan . |
| 61-66118 | 4/1986 | Japan . |
| 249184 | 2/1990 | Japan . |

Primary Examiner—William A. Cuchlinski, Jr.
Assistant Examiner—G. Bradley Bennett
Attorney, Agent, or Firm—Nields & Lemack

[57] ABSTRACT

A rotating and driving system for a survey instrument, wherein a driven wheel is mounted on a shaft of a movable unit and a slide baseplate is disposed on the shaft so as to be movable in a direction perpendicular to the axis of the shaft. A gear, driven by a motor, is mounted on the slide baseplate in such a position that the gear can be engaged with the driven wheel when the slide baseplate is pushed in the proper direction. By providing engaging force between the driven wheel and the gear, backlash is suppressed, and positioning can be achieved at higher accuracy.

5 Claims, 4 Drawing Sheets

ROTATING AND DRIVING SYSTEM FOR SURVEY INSTRUMENT

BACKGROUND OF THE INVENTION

The present invention relates to a rotating and driving system for a survey instrument.

To adjust collimating direction of a telescope on a survey instrument, the survey instrument is provided with a rotating and driving system for rotating a movable unit including the telescope. In recent years, motorized rotating and driving systems for driving movable unit by servomotor have been widely propagated.

Survey instruments are used at various places or under varied outdoor conditions such as in field or mountainous region, etc. The modes to carry or transport the survey instruments are also diverse, and the instruments are usually carried in portable cases so that they may not be damaged even when they are dropped and so on. On each of such carrying cases, a concave portion to match the shape of the instrument is formed, and the instrument is put in the concave portion to prevent loosening or rattling when it is carried in the case.

In the following, description will be given of a conventional type rotating and driving system for survey instrument referring to FIGS. 7 and 8.

In the figures, reference numeral 1 represents a movable unit where telescope and other components are furnished, 2 is a housing for rotatably supporting the movable unit 1, and a rotating and driving system 3 is accommodated in the housing 2.

On both ends of the movable unit 1, shafts 4 and 5 are arranged and the rotating and driving system 3 is connected to one of the shafts 4, and an encoder 6 for detecting rotating angle of the movable unit 1 is disposed on the shaft 5.

Description is given now on the rotating and driving system 3.

In the housing 2, a motor 8 is arranged in parallel with the axis of the rotating shaft of the movable unit 1 via a support 7, and a driving gear 9 is engaged with the output shaft of the motor 8. An idle shaft 10 is rotatably provided on the housing 2. A large diameter reduction gear 11 and a small diameter reduction gear 12 are fixedly mounted on the idle shaft 10, and the large diameter reduction gear 11 is engaged with the driving gear 9. On the shaft 4, a driven gear wheel 13 having a diameter larger than that of the small diameter reduction gear 12 is arranged. The driven gear wheel 13 is engaged with the small diameter reduction gear 12. Rotation of the driving gear 9 is reduced via the large diameter reduction gear 11, the small diameter reduction gear 12, and the driven gear wheel 13, and the rotation is transmitted to the movable unit 1.

By driving the motor 8, the movable unit 1 can be rotated at any angle desired.

As described above, the rotating and driving system of the survey instrument transmits the rotation of the motor 8 to the movable unit 1 via train of gears. In order to accurately transmit the rotation of the motor 8 to the movable unit 1 and to achieve positioning at high precision, backlash among each gear of the gear train should be as small as possible. In actual condition, however, pitch error, tooth profile error, tooth space runout, or lead error occur unavoidably in the manufacture of gears, and backlash among gears must be allowed to some extent for smooth rotation of gears. Therefore, there is some limitations in improving positioning accuracy of the movable unit 1 in the conventional type rotating and driving system for survey instrument.

As described above, a concave portion to match the shape of the survey instrument is formed in the carrying case, and the survey instrument is put in the concave portion in the carrying case so that it may not totter or wobble within the case. However, the movable unit 1 is often moved and tilted during survey operation, and its position does not always match the concave portion of the carrying case. Accordingly, the position of the movable unit 1 must be corrected to match the concave portion of the carrying case. For this reason, in a conventional type rotating and driving unit it is customary to drive the motor 8 and to correct the position of the movable unit 1 to the condition suitable to accommodate the concave portion of the carrying case.

SUMMARY OF THE INVENTION

It is the first object of the present invention to provide a rotating and driving system for a survey instrument, by which it is possible to eliminate backlash in the train of gears between the motor and the movable unit and to improve positioning accuracy of the movable unit. To attain such object, the rotating and driving system according to the present invention comprises a driven wheel mounted on a shaft of a movable unit, a slide baseplate movably disposed on said shaft in a direction perpendicular to the axis of said shaft, a gear mounted on said slide baseplate and engaged with said driven wheel, a motor for driving said gear, and pushing means for pushing said slide baseplate in a direction to engage said gear with said driven wheel.

It is the second object of the present invention to provide a rotating and driving system, in which it is possible to easily correct the position of the movable unit without driving a motor. For this purpose, the system according to the invention comprises a driven wheel provided on a shaft of the movable unit, a slide baseplate slidably mounted with respect to the axis of said shaft, in a direction perpendicular to the axis of said shaft, a gear engaged with said driven wheel on said slide baseplate, whereby said gear can be driven by a motor, and a release button is provided to slide said slide baseplate in a direction to disengage said driven wheel from said gear.

DETAILED DESCRIPTION OF THE PREFERRED EMBODIMENTS

In the following, description will be given of embodiments of the invention in connection with the drawings.

Figure 1:
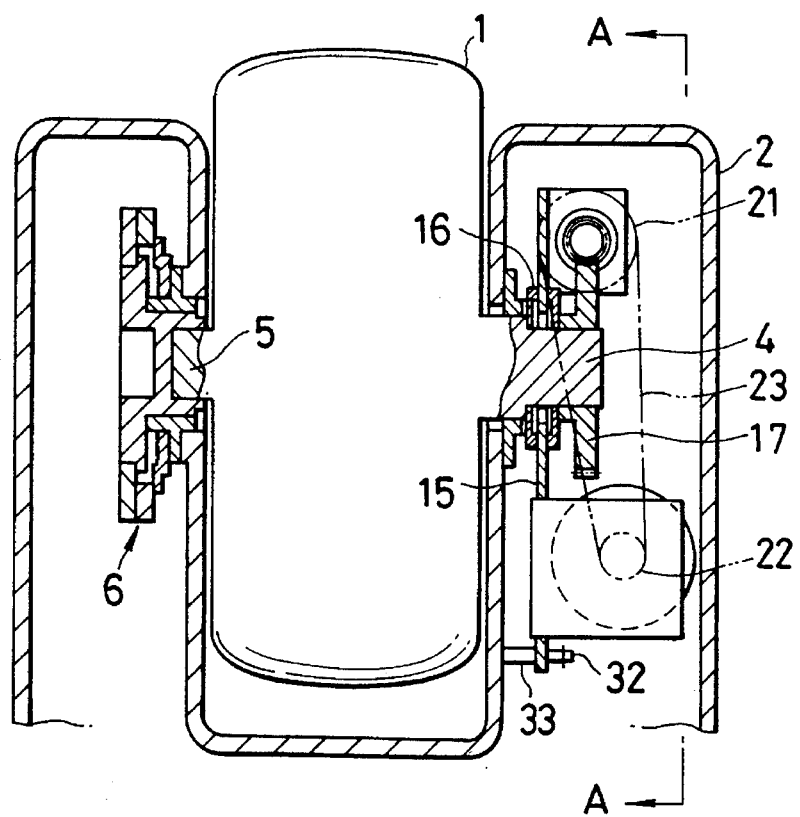
FIG. 1 is a cross-sectional view of an embodiment of the present invention.
Figure 2:
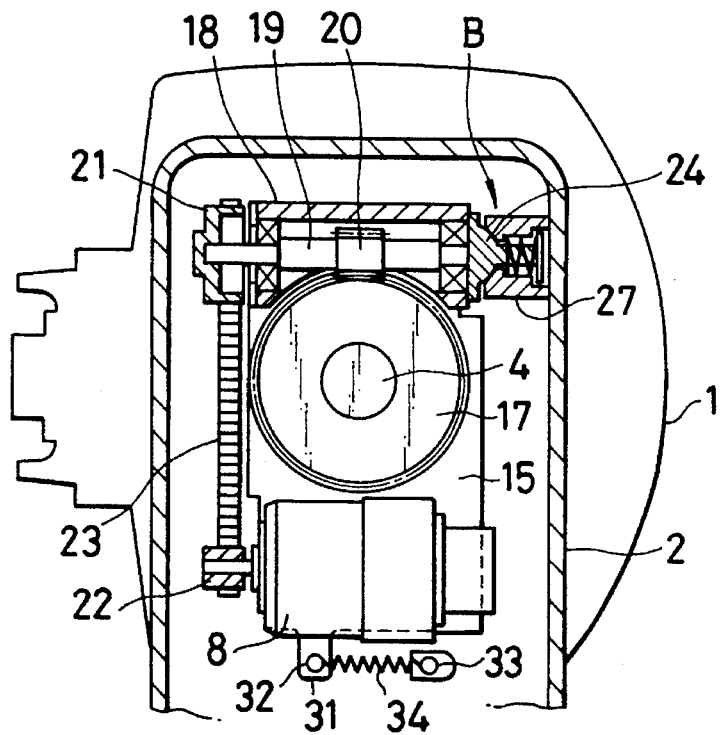
FIG. 2 is a section along the line A—A of FIG. 1.
Figure 7:
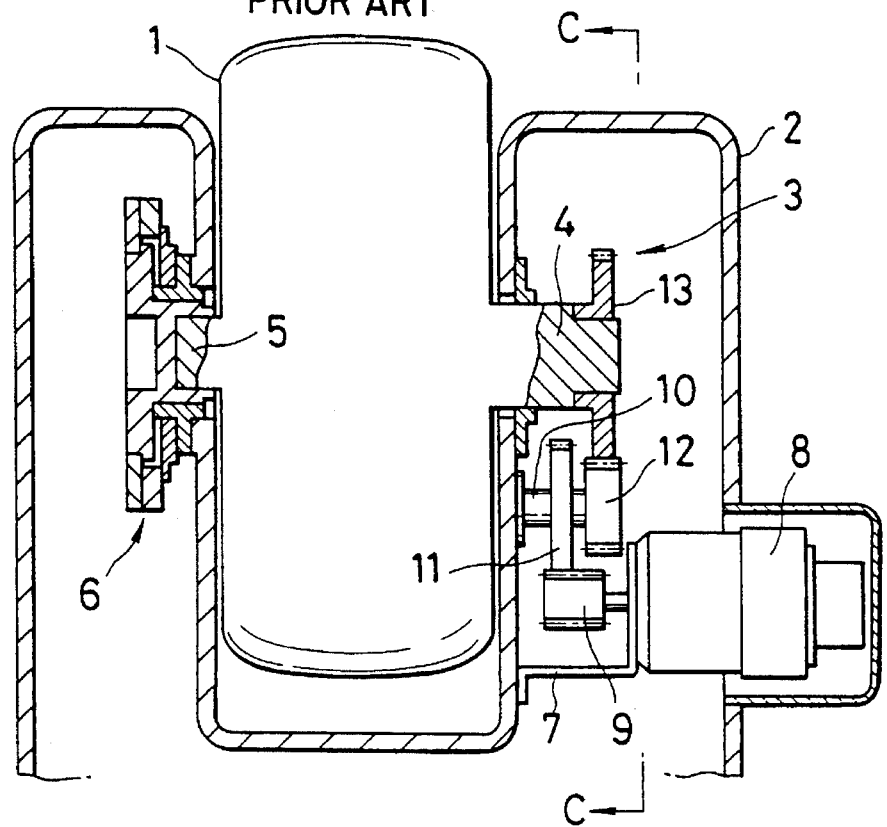
FIG. 7 is a cross-sectional view of a conventional type system.
Figure 8:
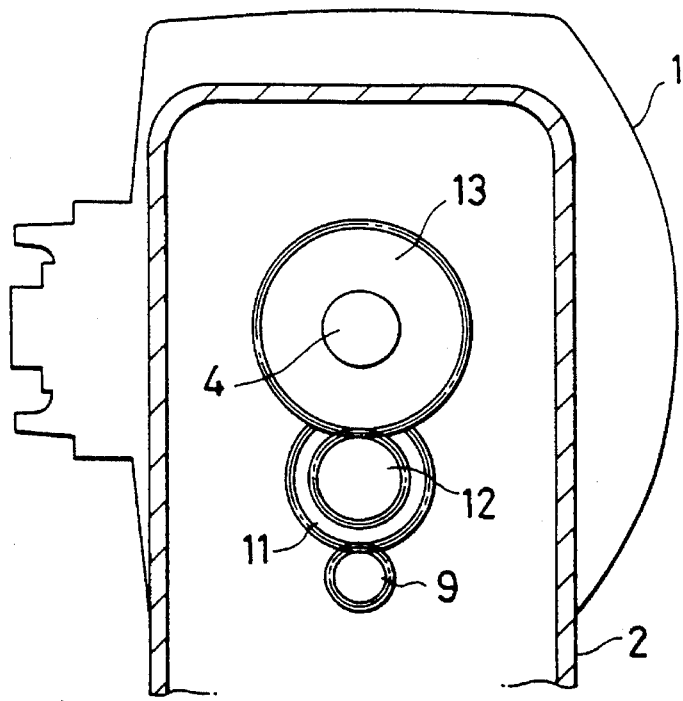
FIG. 8 is a section along the line C—C of FIG. 7.

In FIGS. 1 and 2, components which are the same as in FIGS. 7 and 8 are referred to by the same symbol, and detailed description is not given here.

A slide baseplate 15 is movably engaged on a shaft 4 of a movable unit 1, and said slide baseplate 15 is sandwiched between a pair of flanges 16 fixed on the shaft 4 so that the slide baseplate 15 is slidable in a direction perpendicular to axis of the shaft 4. The function of the flanges 16 to guide the slide baseplate 15 in the sliding direction and to suppress tottering of the slide baseplate 15. A worm wheel 17 is fixed on the shaft 4 as a driven gear wheel.

A shaft support block 18 is fixed on the slide baseplate 15, and a driven shaft 19 is rotatably mounted on the shaft support block 18. A worm 20 is formed on the driven shaft 19, and the worm 20 is engaged with the worm wheel 17. One end of the driven shaft 19 protrudes from the shaft support block 18, and a driven pulley 21 is fixed on the protruding end. A motor 8 is arranged opposite to the shaft support block 18 across the worm wheel 17, and it is mounted on the slide baseplate 15. On the output shaft of the motor 8, a driving pulley 22 is mounted, and a belt 23 is wound around the driving pulley 22 and the driven pulley 21.

Figure 3:
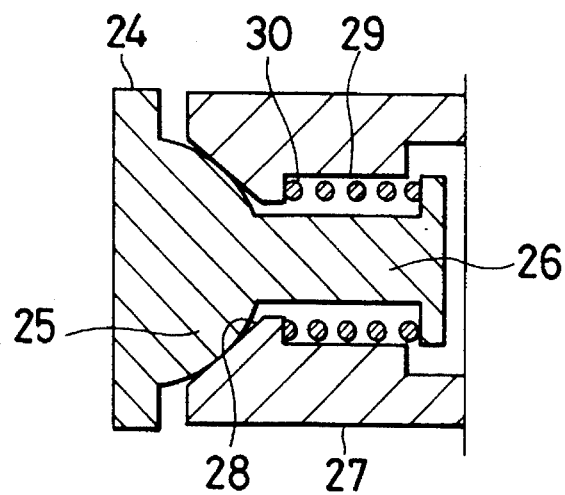
FIG. 3 is an enlarged partial view of the portion B of FIG. 2.

A pivot shaft 24 is fixedly attached on the side of the shaft support block 18 opposite to the driven pulley 21. The pivot shaft 24 is concentric to the driven shaft 19, and as shown in FIG. 3, it is provided with a spherical surface 25 and a spring guide 26, which extends further from the spherical surface 25 and has a flange at an end thereof. A pivot block 27 is disposed on the inner wall of the housing 2 at a position face-to-face with the pivot shaft 24. A conical concave surface 28 is formed on the pivot block 27 to be in contact with the spherical surface 25, and a spring retaining hole 29 for receiving the spring guide 26 is provided in the pivot block 27.

A spring 30 is engaged in the spring retaining hole 29, and the pivot shaft 24 is resiliently pushed by the spring 30 in a direction to press the spherical surface 25 against the conical concave surface 28, (to the right in FIG. 3). The slide baseplate 15 is movably supported around the center of the spherical surface 25. The driving components other than the worm wheel 17, such as the motor 8, the shaft support block 18, etc. on the slide baseplate 15 are moved in integrated manner.

On lower end of the slide baseplate 15, a tongue 31 is formed. A rocking pin 32 is mounted on the tongue 31, and a fixed pin 33 is mounted face-to-face with the rocking pin 32 on the housing 2, and a backlash suppressing spring 34 is spun between the fixed pin 33 and the rocking pin 32. The slide baseplate 15 is pushed by the backlash suppressing spring 34 counterclockwise in FIG. 2, i.e. in a direction to press the worm 20 against the worm wheel 17.

In the following, description will be given of the operation.

As described above, the slide baseplate 15 is movable around the spherical surface 25 and is pushed by the backlash suppressing spring 34 counterclockwise, and a predetermined engaging force is provided between the worm 20 and the worm wheel 17.

When the motor 8 is driven and the driving pulley 22 is rotated, the worm 20 is rotated via the belt 23 and the driven pulley 21. The rotating speed is reduced between the worm 20 and the worm wheel 17 when the worm wheel 17 is rotated, and the movable unit 1 is further rotated via the shaft 4. Because a predetermined engaging force is provided between the worm wheel 17 and the worm 20, backlash between the worm wheel 17 and the worm 20 is suppressed, and positioning can be achieved at high accuracy.

Because the spherical surface 25 is pressed against the conical concave surface 28 by the spring 30, there is no backlash between the pivot shaft 24 and the pivot block 27. In an alternative construction the pivot block 27 may be mounted on the shaft support block 18, and the pivot shaft 24 may be arranged on the housing 2.

Figure 4:
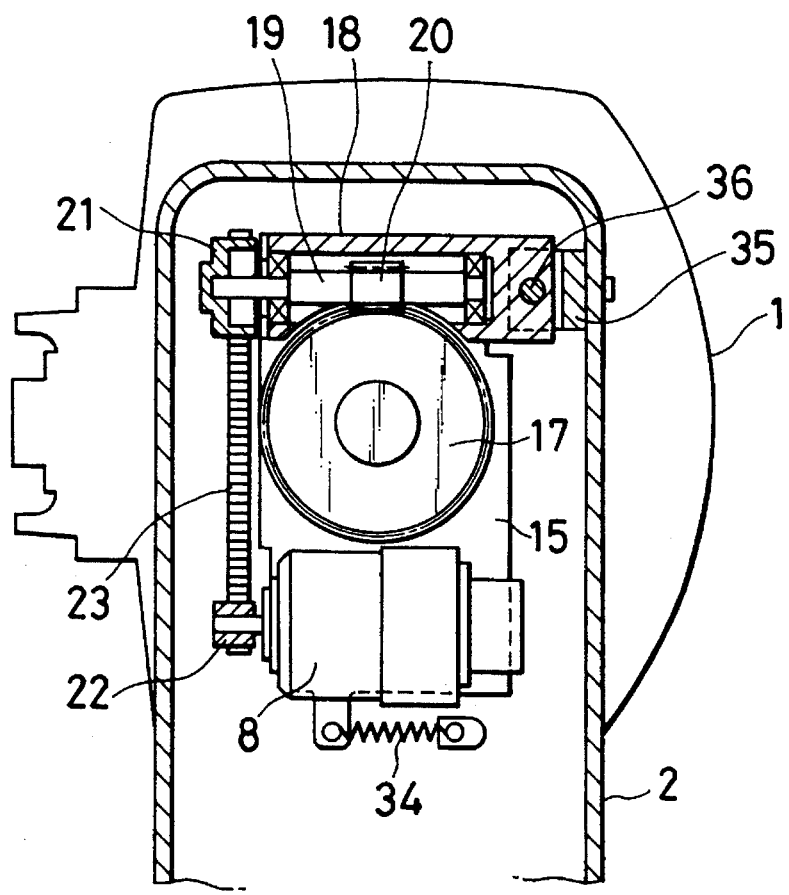
FIG. 4 is a drawing similar to the section of FIG. 2, showing another embodiment of the invention.

Various types of mechanism can be conceived for movably supporting the slide baseplate 15, and another example is given in FIG. 4.

A support block 35 is fixed on the housing 2, and the shaft support block 18 is pivotally mounted on the support block 35 via a shaft 36. The axis of the shaft 36 is parallel to the axis of rotation of the worm wheel 17, and the slide baseplate 15 is movably supported around the shaft 36. When the slide baseplate 15 is pushed counterclockwise by the backlash suppressing spring 34, engaging force to suppress backlash is provided between the worm wheel 17 and the worm 20.

The backlash suppressing spring 34 may be mounted at any position or may be designed in any type as long as it can give engaging force between the worm wheel 17 and the worm 20, and the concave portion to be engaged with the spherical surface 25 may be spherical. Although a belt and a worm gear are used as power transmission means in the present embodiment, it is needless to say that a gear train and a spur gear may be used as in the conventional system. A movable unit including telescope is described in the present invention, while a housing for horizontal rotation may be also used.

Next, description will be given of an embodiment for the second object of the invention, i.e. an embodiment for easily correcting position of the movable unit.

Figure 5:
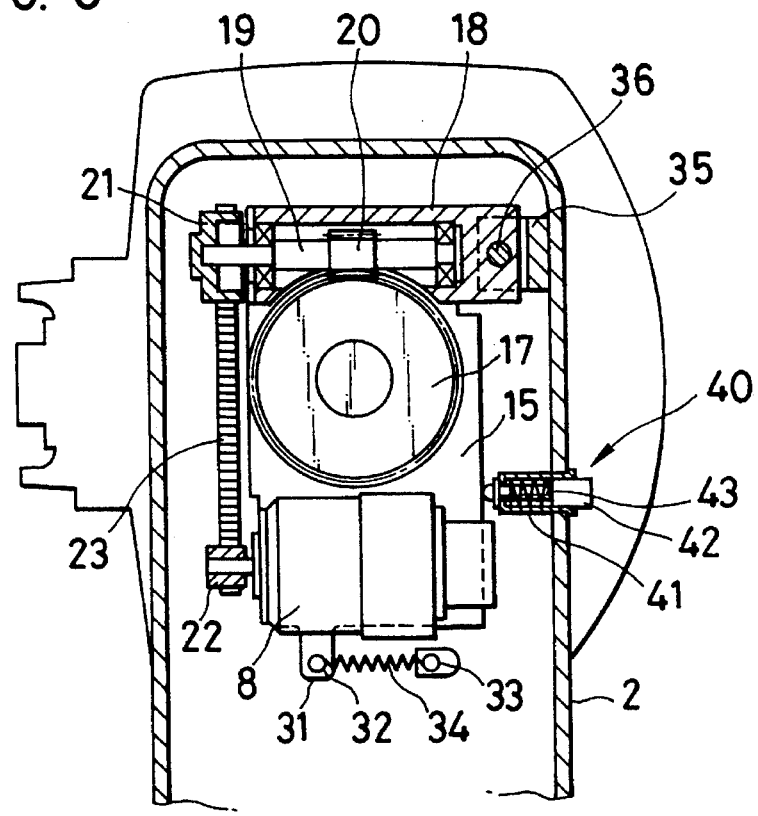
FIG. 5 is a drawing similar to the section of FIG. 2, showing still another embodiment of the invention.
Figure 6:
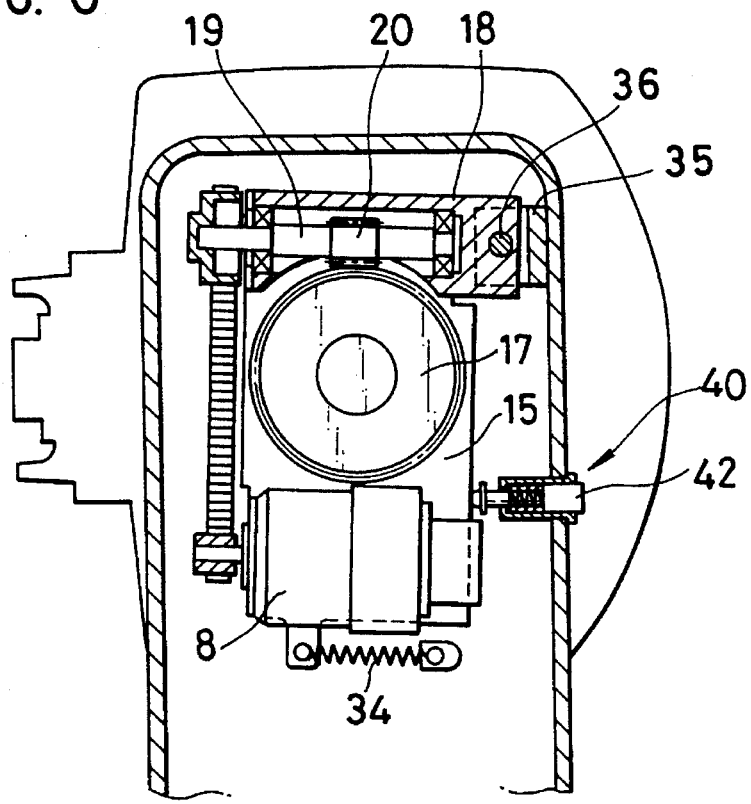
FIG. 6 is a drawing showing operation of the embodiment of the invention shown in FIG. 5.

In the embodiment shown in FIG. 5, a mechanism to release the movable unit is provided for easily correcting the position of the movable unit of the embodiment shown in FIG. 4.

A release button 40 is provided on the housing 2 at a position facing the edge of the slide baseplate 15 (right edge in FIG. 5).

A cylinder 41 passes through the housing 2, and a push rod 42 is slidably inserted into the cylinder 41. A return spring 43 is engaged in the cylinder 41, and the push rod 42 is pushed away from the slide baseplate 15 by the return spring 43. The release button 40 is a self-retaining type pushbutton. When the push rod 42 is pressed, it is retained at the end of its stroke, and when the push rod 42 is pressed again, it is released and returned to the initial position.

In case it is desired to manually correct the position of the movable unit 1, the push rod 42 is pressed. The tip of the push rod 42 protrudes and the slide baseplate 15 is rotated clockwise in FIG. 2. The protruding condition of the push rod 42 is retained, and the slide baseplate 15 is also retained as it is rotated to the desired extent.

Because the shaft support block 18 is fixed on the slide baseplate 15, the worm 20 is also rotated clockwise, and the engagement between the worm 20 and the worm wheel 17 is released. Thus, the movable unit 1 can be freely rotated and its position can be corrected manually.

When the position has been corrected, the push rod 42 is pressed again to release self-retaining of the push rod 42. By the spring 34, the slide baseplate 15 is rotated counterclockwise in FIG. 2. The worm 20 and the worm wheel 17 are engaged again, and the movable unit 1 is turned to the locked state.

Various structures can be conceived for the release button to move the slide baseplate 15. For example, it may be designed in such manner that the push rod is pressed and is then rotated to retain the depressed state, or that a cam may be used and the cam is rotated by a knob provided outside, or that moving means is provided on top surface of the housing 2 in FIG. 2 and the slide baseplate 15 may be pulled up by a pull button. Further, the slide baseplate 15 may be slid in linear direction, or the slide baseplate 15 may be slidable only in vertical direction in the figure, and the slide baseplate 15 may be pushed downward by the spring 34. Although belt and worm gear are used as power transmission means in the present embodiment, a gear train and a spur gear may be used as in the conventional system. It is needless to say that the release mechanism by push rod can be used when the present embodiment is used on the housing.

What I claim is:

1. A rotating and driving system for a survey instrument, comprising a driven wheel mounted on a shaft of a movable unit, a slide baseplate disposed on said shaft so as to be movable with respect thereto in a direction perpendicular to the axis of said shaft, a gear mounted on said slide baseplate and engaged with said driven wheel, a motor for driving said gear, and pushing means for pushing said slide baseplate in a direction to engage said gear with said driven wheel.

2. A rotating and driving system for a survey instrument according to claim 1, having a fixed housing, wherein a pivot shaft having a spherical surface is provided on one of the slide baseplate or the fixed housing, a pivot block having a concave portion to engage with said spherical surface is disposed on the other of the slide baseplate or the fixed housing, and a spring for pressing the spherical surface on the concave portion is disposed.

3. A rotating and driving system for a survey instrument according to claim 1, wherein the slide baseplate is movably supported via a second shaft in parallel to the shaft of the movable unit.

4. A rotating and driving system for a survey instrument according to one of claims 1 to 3, wherein said gear is a worm, and the motor for driving said worm is arranged on the slide baseplate.

5. A rotating and driving system for a survey instrument according to one of claims 1 to 3, wherein a release button is provided in order that said slide baseplate is slid in a direction to separate said driven wheel from said gear.

* * * * *